US009013620B2

(12) United States Patent
Luo

(10) Patent No.: US 9,013,620 B2
(45) Date of Patent: Apr. 21, 2015

(54) MULTIPLE BAND IMAGER AND METHOD

(75) Inventor: Yun Luo, Ann Arbor, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 400 days.

(21) Appl. No.: 13/090,591

(22) Filed: Apr. 20, 2011

(65) Prior Publication Data

US 2012/0268646 A1 Oct. 25, 2012

(51) Int. Cl.
H04N 5/225 (2006.01)
H04N 5/33 (2006.01)

(52) U.S. Cl.
CPC .......... *H04N 5/332* (2013.01); *H04N 2209/047* (2013.01)

(58) Field of Classification Search
CPC ........................ H04N 5/332; H04N 2209/047
USPC ...................... 348/113–120, 266–283; 257/21
See application file for complete search history.

(56) References Cited

U.S. PATENT DOCUMENTS

| 5,373,182 | A  | * | 12/1994 | Norton ........................... 257/440 |
| 5,567,955 | A  | * | 10/1996 | Liu ................................. 257/21 |
| 6,028,323 | A  | * | 2/2000  | Liu ................................. 257/21 |
| 6,597,807 | B1 | * | 7/2003  | Watkins et al. ............... 382/164 |
| 7,030,775 | B2 |   | 4/2006  | Sekiguchi |
| 7,079,307 | B2 |   | 7/2006  | Chun Liu et al. |
| 7,247,851 | B2 |   | 7/2007  | Okada et al. |
| 7,274,393 | B2 |   | 9/2007  | Acharya |
| 7,456,384 | B2 |   | 11/2008 | Toda |
| 7,491,937 | B2 |   | 2/2009  | Nakanishi et al. |
| 7,577,299 | B2 |   | 8/2009  | Kawamata et al. |
| 7,582,871 | B2 | * | 9/2009  | Tadano ..................... 250/339.05 |
| 7,705,308 | B2 |   | 4/2010  | Suzuki |
| 7,786,898 | B2 |   | 8/2010  | Stein et al. |
| 2003/0092212 | A1 |   | 5/2003  | Buchanan et al. |
| 2004/0135881 | A1 | * | 7/2004  | Jones et al. ...................... 348/33 |
| 2004/0169749 | A1 | * | 9/2004  | Acharya ....................... 348/279 |
| 2005/0029456 | A1 |   | 2/2005  | Eggers et al. |
| 2006/0114320 | A1 | * | 6/2006  | Nagaoka et al. .............. 348/118 |
| 2007/0146512 | A1 | * | 6/2007  | Suzuki et al. ................. 348/272 |
| 2007/0247517 | A1 | * | 10/2007 | Zhang et al. ..................... 348/30 |
| 2011/0169911 | A1 | * | 7/2011  | Gabura ........................... 348/32 |

FOREIGN PATENT DOCUMENTS

EP 0 820 106 A2 1/1998
GB 2 300 486 A 11/1996

OTHER PUBLICATIONS

US 7,842,924, Nov. 2010, Kato et al. (withdrawn).

* cited by examiner

Primary Examiner — Twyler Haskins
Assistant Examiner — Dwight C Tejano
(74) Attorney, Agent, or Firm — Tarolli, Sundheim, Covell & Tummino LLP

(57) ABSTRACT

Apparatus for imaging a scene, comprising a focusing structure for focusing light emanating from a scene on an imaging subsystem, and an imaging subsystem. The imaging subsystem includes an imager, disposed within the optical path of the focusing structure, having an array of pixels sensitive to light at frequencies higher than far infrared frequencies, and a frequency shifter disposed between the lens element and the imager. The frequency shifter includes an array of frequency-shifting elements disposed over a subset of the array of pixels, the elements shifting the far infrared frequencies from the focused light to higher frequencies and transmitting the resulting signals to the subset of the array of pixels.

16 Claims, 3 Drawing Sheets

MULTIPLE BAND IMAGER AND METHOD

FIELD OF THE INVENTION

The present invention is directed to imaging systems, and particularly to a multiple band imager and method for use by vehicles.

BACKGROUND OF THE INVENTION

U.S. Pat. No. 7,786,898 (Stein et al.) describes an automobile equipped with a sensing system that including two cameras, one an optical camera and the other a far infrared (thermal) camera, together with a control module for using the camera signals.

U.S. Pat. No. 7,491,937 (Nakanishi et al.) describes an image sensor capable of picking up both visible and infrared images. The sensor includes one integrated circuit carrying an array of thermal and optical sensors.

U.S. Pat. No. 5,567,955 (Liu) describes an infrared thermal detector incorporating a far infrared to near infrared energy convertor.

SUMMARY OF THE INVENTION

The present invention is directed to a single, integrated camera or imaging device that can provide separate optical and thermal (far infrared) signals.

In accordance with one aspect of the present invention, a method of imaging a scene includes the steps of
 focusing light emanating from a scene on a surface having an array of pixels that are insensitive to far infrared light but are sensitive to light at other frequencies,
 for a proper subset of pixels of the array of pixels, shifting the far infrared component of the light to a frequency to which the pixels are sensitive, and
 generating separate thermal and non-thermal images from the array of pixels.

In accordance with one example embodiment of the present invention, an apparatus is provided for imaging. The apparatus includes a structure for focusing light emanating from a scene on an imager subsystem. The imager subsystem includes an imager that is disposed within the optical path of the focusing structure, the imager having an array of pixels sensitive to light at frequencies higher than far infrared frequencies. The imaging subsystem further includes a frequency-shifter disposed between the focusing structure and the imager, where the frequency-shifter includes an array of frequency-shifting elements disposed over a proper subset of the imager pixels, where the frequency-shifting elements shift far infrared frequencies from the focused light to frequencies to which the imager pixels are sensitive.

The frequency shifting elements may each comprise a frequency convertor having a detector for receiving far infrared frequencies and an emitter that is responsive to the detector for generating higher frequency light.

The frequency-shifter may include one frequency shifting element aligned over each sub-array of N×M imager pixels, where N may equal M.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

As used herein, the term "far infrared" refers to a range of the light spectrum encompassing at least wavelengths from 8 to 15 μm.

Figure 1:
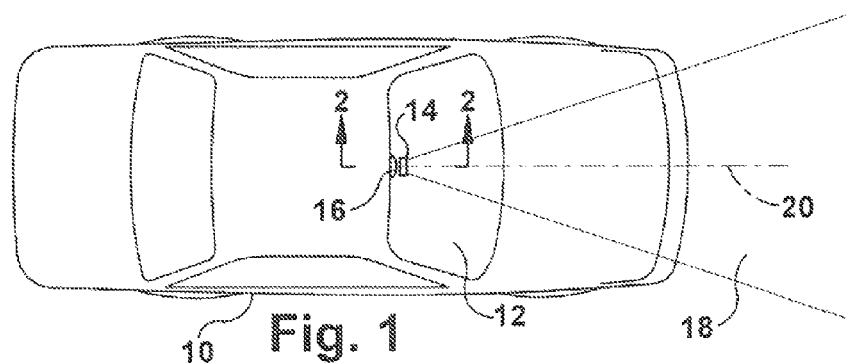
FIG. 1 is a schematic top view of an automobile equipped with an imager constructed in accordance with one example embodiment of the present invention.
Figure 2:
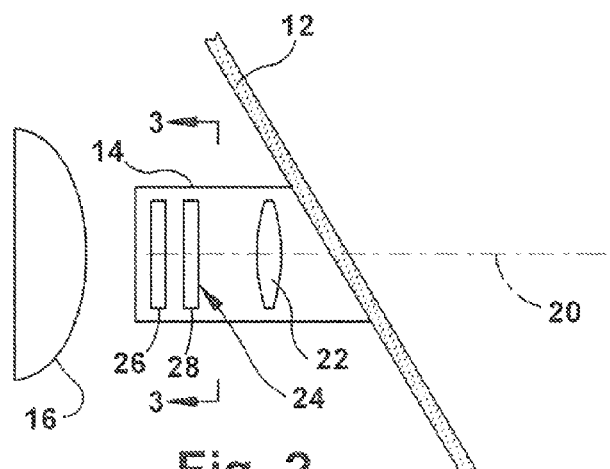
FIG. 2 is a schematic sectional side view of a portion of the vehicle of FIG. 1 and particularly showing an imager component and a frequency shifter component made in accordance with an example embodiment of the present invention.

Referring to FIGS. 1 and 2, a vehicle 10 (an automobile, in this example) is equipped with a windscreen 12. A camera 14 is mounted within the cab of the vehicle, preferably attached directly or indirectly to the inside surface of the windscreen 12 at an upper, central location. In the Figures, the camera is mounted generally between the rear-view mirror 16 and the windscreen 12. The camera may be attached to or integrated with the rear-view mirror through suitable structural elements, not shown.

The camera 14 is forward-looking (with respect to the normal direction of travel of the vehicle) so as to receive light through the windscreen 12, and has a field of view 18 centered on an optical axis 20. The optical axis 20 is angled downward slightly to allow the camera to view an area just ahead of the vehicle 10, encompassing, e.g., the front of the vehicle to thirty meters ahead of the vehicle. The direction, inclination, and field of view of the camera is chosen according to the intended function of the system, such as hazard detection, road sign detection, lane change or lane following guidance, pedestrian detection, etc.

The camera 14 is sensitive to far infrared ("FIR") frequencies, as well as frequencies that are greater than FIR frequencies, such as near infrared ("NIR") and/or optical frequencies, and provides two separate readout signals, one for the FIR image and a second for the optical and/or NIR image. (For convenience of description, the phrase "optical and/or NIR" will sometimes be shortened to just "optical/NIR".) Structural elements within the optical path should not block the frequencies of interest, hence the windscreen 12, or at least the portion of windscreen 12 that lies along the optical path surrounding the optical axis 20, should be transparent to FIR frequencies as well as optical/NIR frequencies.

The camera 14 includes a structure 22 for focusing light emanating from a scene onto an imager subsystem 24. The focusing structure 22 is preferably a single lens or multiple lens assembly. Alternatively, a mirror assembly or combination of lenses and mirrors could instead be used as the focusing structure. The imager subsystem 24 includes a conventional charge-coupled device (CCD) or, alternatively, complementary metal oxide semiconductor (CMOS) imager 26 disposed within the optical path of the focusing structure 22, generally aligned with the optical axis 20. Such conventional CCD or CMOS imagers comprise a regular, planar, rectangular array of pixels sensitive to light at optical/NIR frequencies. Conventional imagers such as imager 26 are insensitive to FIR frequencies. The imager 26 has a resolution, e.g. 320 by 240 pixels, or 640 by 480 pixels, or some alternative resolution, suited to the resolution requirements of the application. Such imagers are known, per se, in the art and the details of construction and operation thereof will not be described.

The imaging subsystem further includes a frequency-shifter 28 disposed within the optical path between the focusing structure 22 and the imager 26 such that light from the imaged scene passes through the frequency-shifter before arriving at the imager. The frequency-shifter 28 is planar in configuration and bears an array of frequency-shifting elements disposed over on its surface at locations selected to overlay a proper subset of the imager pixels. The elements of the frequency-shifter 28 each shift the FIR component of impinging light to higher frequencies (lower wavelengths) to which the imager pixels are sensitive.

In the described example embodiment, the broad planar surface of the frequency-shifter 28 is generally sized in height and width to match the height and width of the imager 26, but it could instead be larger or smaller in size than the imager. The frequency-shifter 28 is mounted closely adjacent the imager 26 such that the broad surfaces of the frequency-shifter and imager are parallel to one another and are either very closely spaced or in contact. Because of the alignment and close spacing of the two components, each pixel of the imager 26 will receive, and thus respond, only to light passing through the portion of the frequency-shifter 28 that is immediately above that pixel. ("Above", in this case, meaning spaced from the pixel in a direction generally perpendicular to the broad planar face of the imager 26, or, stated differently, in a direction generally along optical axis 20.)

In the embodiment being described the frequency-shifting elements 30 are each approximately the size of one pixel of the imager 26, and the elements are spaced transversely apart from one another by an integral multiple of the spacing of the imager pixels such that each element 30 is disposed above a corresponding single pixel of the imager 26 when the frequency shifter 28 is fixed in alignment above the imager 26. As will be explained more fully below, however, the size and transverse spacing of the elements 30 need not match the pixel size and spacing in this manner.

Figures 3, 3A:
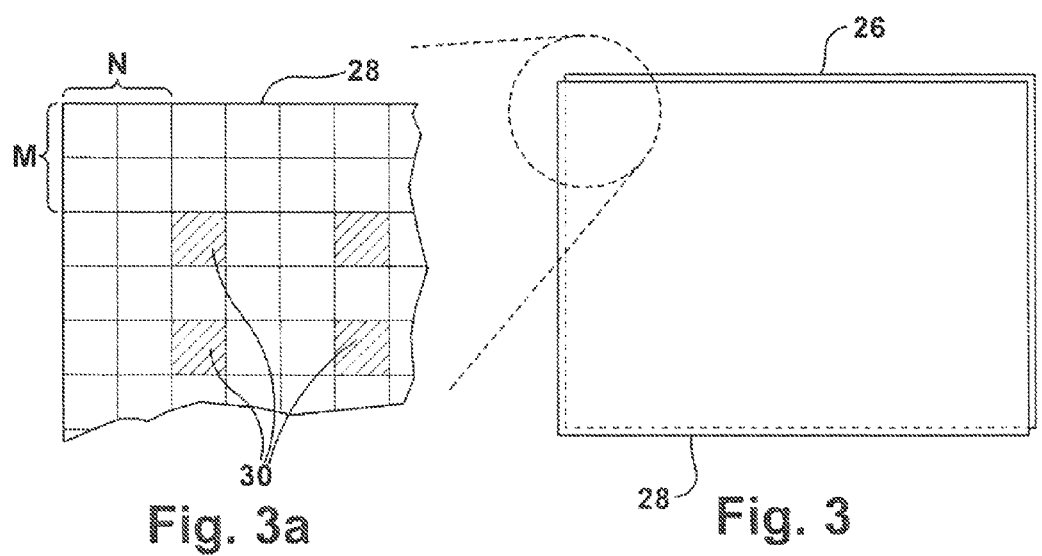
FIG. 3 is a front view of the imager subsystem of FIG. 2, with FIG. 3a showing the relative alignment of imager pixels and frequency-shifting elements.

FIG. 3a shows, for the embodiment being described, the relationship between the imager pixel spacing and the frequency-shifter element spacing. The regular grid or array shown in FIG. 3a (which is not a physical feature of the device but rather shown for illustration purposes only) includes squares arranged in rows and columns, with each square signifying the location of a corresponding pixel in the associated imager. In the frequency-shifter, the majority of these squares (those not occupied by frequency-shifting elements 30) are generally transparent to optical/NIR frequencies, allowing the impinging light to pass through to the imager. Frequency-shifter elements 30 are, however, formed in a subset of these squares such that a corresponding subset of imager pixels receive light having a frequency adjusted by the elements of the frequency shifter that cover those pixels. To achieve the multiple band imaging, the subset must necessarily be smaller than the set itself, hence the subset is a 'proper subset' of the set of pixels. Generally, in one of each M row of squares, one of every N squares contains a frequency-shifting element. In the FIG. 3a example embodiment, N=M=3 such that, in each sub-matrix of 3×3 pixels (three rows by three columns), one pixel receives light that has been converted from FIR frequencies, while the remainder receive optical/NIR frequencies.

The frequency-shifter elements 30 may take any known form. Each element may, for example, comprise a series combination of an FIR detector (e.g., QWIP detectors) and an optical/NIR LED, stacked one atop the other. The stacks are formed in a direction generally perpendicular to the broad surface of the frequency shifter. In such an arrangement, each LED generates optical/NIR light at levels proportional to FIR (thermal) light impinging on the corresponding detector. The frequency shifter will be oriented such that the FIR detectors face the focusing structure and the LED emitters face the pixels of the imager 26. Each element 30 may beneficially be designed to block optical and NIR light (as explained in more detail below), however, that is not a necessary feature of the frequency shifter. When the element 30 is so designed, the pixel beneath that frequency-shifting element provides an output that is proportional to the FIR light impinging on that element 30.

Depending upon the technology used for the frequency-shifter 28, the shifter may or may not require passive or active cooling for optimal operation.

The imager 26 will provide an output signal that combines optical/NIR image information with FIR image information. By suitable sampling of the output signal, synchronized with the readout of the imager pixels, the two types of image information can readily be separated into two separate image representations—one corresponding to the optical/NIR image and the other corresponding to the FIR image.

Figure 4:
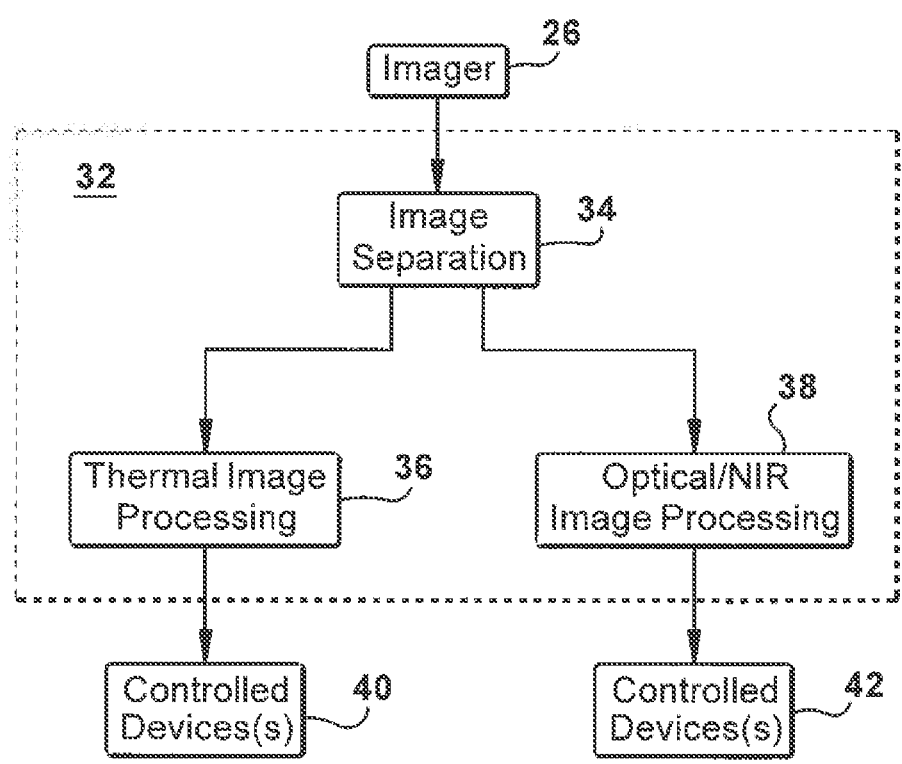
FIG. 4 is a functional block diagram of an electronic system for the imager of FIG. 1; and, FIG. 5 is a flow chart illustrating an imaging process in accordance with an example embodiment of the present invention.

Referring to FIG. 4, this separation is performed by a processor 32, which may be a programmed microcomputer or an application specific integrated circuit (ASIC). The processor 32 performs an image separation function 34 (see FIG. 5), and the separated thermal and optical/NIR images are processed through respective image processing functions 36 and 38. The resulting processed information, which may yet constitute images as a digitized video signal or may also or instead comprise discrete feature information (size, location, qualitative/quantitative attributes of the features of the imaged scene), is used by controlled devices 40 and 42. The controlled devices may comprise passive display devices, e.g. video displays mounted in the cab of the vehicle for displaying thermal or optical images (basic or enhanced) to the vehicle driver, or active devices such as steering systems, braking systems, driver warning systems, or integrated vehicle stability control systems. Any such active devices will use the thermal and/or optical/NIR information as data inputs to sophisticated algorithms that use the data to enhance the performance of the respective devices.

In FIG. 4 the processor 32 is schematically shown as containing function blocks, but this is for explanatory purposes only and in fact the functions will be executed by, for example, a conventional microcomputer including the typical elements of a microcomputer (single or multiple processor cores, memory, i/o elements, etc.). The microcomputer will perform the illustrated and described functions in a stepwise manner pursuant to its stored program.

Figure 5:
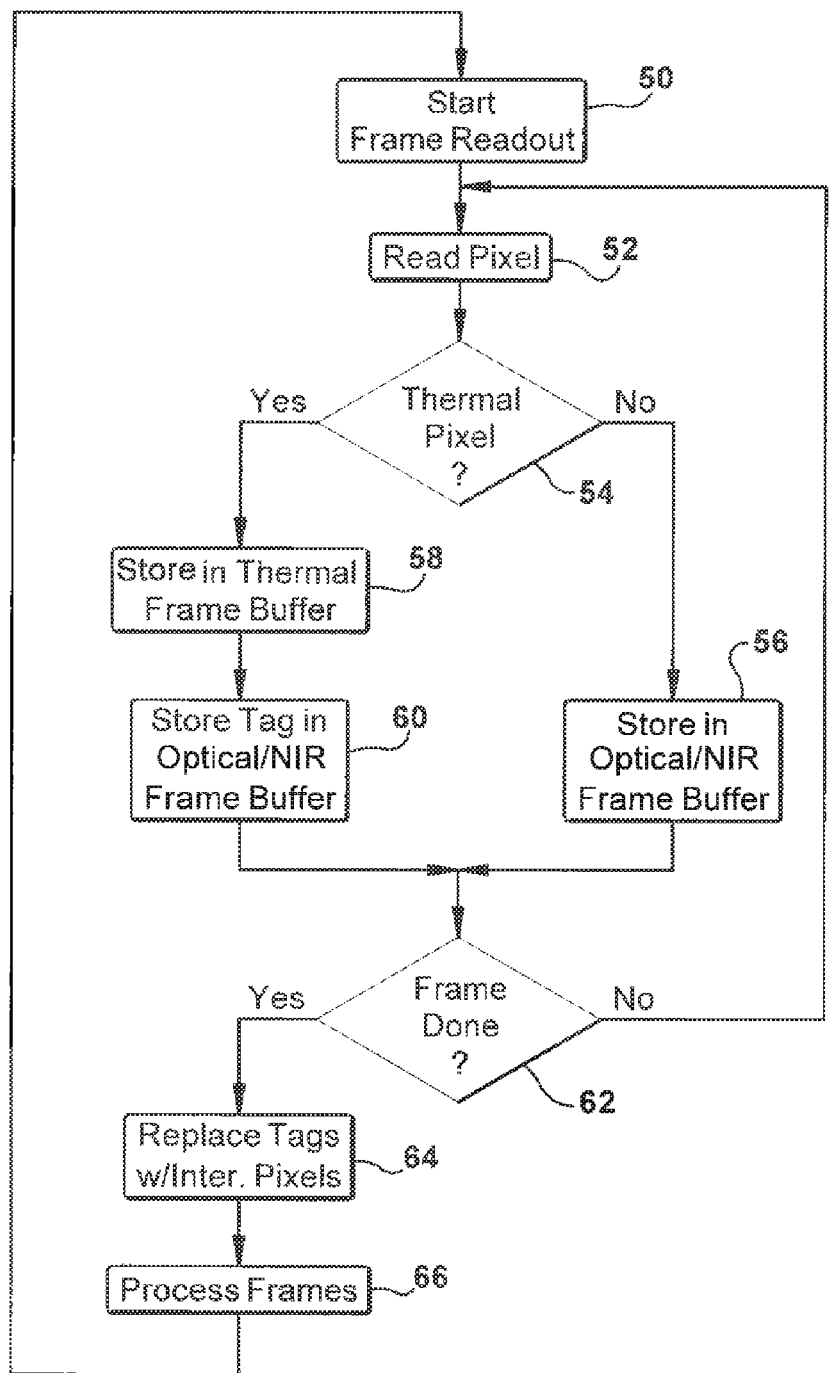

FIG. 5 shows a process in accordance with one example embodiment of the present invention. More particularly, FIG. 5 is a flow chart of one example of a program-controlled sequential process, performed by processor 32, for separation of the thermal and optical/NIR information into different image frames. The process is performed in a recursive loop, and will be preceded, upon startup, by an initialization step of conventional form (not shown). The frame readout process begins in step 50. A pixel is readout from the imager in step 52, and a test is made in step 54 as to whether this particular pixel contains thermal information.

In the embodiment being described, the imager and frequency shifter are manufactured such that, by design, each $3^{rd}$ pixel of each $3^{rd}$ row (for example) is a thermal pixel. Thus, test 54 can be readily accomplished by counting rows within a frame, and pixels within a row.

If the imager/shifter alignment is not pre-established through such a manufacturing alignment processes, then the test 54 is instead accomplished through reference to a pixel characterization matrix that is stored in the memory of the processor 32. The matrix is created by a pixel characterization process performed during the manufacture of the imager subsystem. During the characterization process, the imager subsystem is exposed to a flat FIR field, preferably monochromatic, and the pixels readout one after another. The elements of the matrix are then loaded with information (which could be as simple as a binary 1 or 0) indicating whether the corresponding pixel of the imager responded to the FIR illumination. The matrix thus includes one element for each pixel. If such a pixel characterization matrix is used, the test 54 is performed by consulting the matrix element corresponding to the pixel that has just been readout in step 52.

In either case, program flow proceeds to step 56 if the pixel is a normal optical/NIR pixel, and to step 58 if the pixel is a thermal pixel. If step 56 is performed, the pixel information (representing the intensity of light detected by that pixel) is stored in a corresponding location within an optical image buffer. If step 58 is performed, the pixel information is loaded in a corresponding location in a thermal image buffer and then, in step 60, a distinctive place-holder tag is loaded into the corresponding location within the optical image buffer in place of the thermal pixel.

Step 62 is a test of whether readout of an entire frame has been completed. If not, program flow loops back to step 52 to continue the pixel readout process. Otherwise, the processor proceeds (step 64) to groom the data in the optical frame buffer by replacing each of the place-holder tags with a synthesized value approximating the optical/NIR value that would have existed at that spot, had the interposed FIR frequency-shifting element been absent. Preferably, the value will correspond to an interpolated optical/NIR value; for example, to the average of the 8 surrounding pixels.

The finished optical/NIR and thermal image frames are then used in step 66 by the previously described processing functions 36 and 38. To accommodate simultaneous frame data collection and frame data use, steps 50 through 64 could be performed by a first processor, while a second processor independently performs the processes 36 and 38 within step 66. The two processors would both have access to a common memory space. Two or more frame memories may be provided for each type of image (that is, FIR and optical/NIR) with one being populated with new data while the other(s) is/are available to be used in the image processing functions 36 and 38.

Two images are thus derived from the imager—an optical/NIR image having the full resolution of the imager, and an FIR (thermal) image having a resolution that is a fraction ($1/8^{th}$, in the illustrated embodiment) of the resolution of the optical/NIR image.

The flowchart of FIG. 5 is merely illustrative. It will be apparent to one skilled in the art that many alternative processes may be undertaken to achieve the same image-separation and image processing result.

It was previously mentioned that the elements 30 of the frequency shifter may beneficially be opaque to the optical/NIR frequencies to which the imager is responsive. If so, then the only light received by the respective pixel under the element 30 is that light which was generated by that element 30. This opacity is not necessary to the implementation of the invention. If the element 30 is transparent to some degree to optical/NIR frequencies then the response of the respective pixel is contaminated by a response to these frequencies. This effect may be removed by adjusting each thermal pixel in the thermal image buffer. For example, the effect may be diminished or eliminated by subtracting from each thermal pixel an amount proportional to the level of the corresponding interpolated pixel calculated in step 64. Moreover, if the optical/NIR transmission characteristic of each element 30 is non-linear, then the interpolated pixel level may be adjusted in a corresponding non-linear manner before subtraction from the thermal pixel.

For convenience of description, the described example embodiment has frequency elements 30 carefully sized and aligned above a proper subset of the pixels of the imager, with each frequency-shifting element 30 covering a single imager pixel. As stated above, this is not necessary to a realization of the invention. The elements 30 of the frequency shifter may be larger than the pixels of the imager, and/or the elements 30 may not have a specific periodic alignment with the pixels of the imager. Instead the pixel characterization matrix described above (with respect to step 52 of FIG. 5) may be used to identify those pixels of the imager that are covered by the elements 30 of the frequency shifter, with the frame separation proceeding through the described process. Furthermore, it is not necessary that the frequency shifter elements be distributed evenly across the face of the imager 26. If some region of the field of view 18 is of particular thermal interest, then the frequency shifter elements may be congregated around that region of the imager 26 and omitted from other regions.

Although in the described embodiment the focusing structure focuses all frequencies in the same manner such that the thermal image and the non-thermal images are registered over one another (in aligned overlapping relationship), it is possible to isolate a region of the imager 26 for detection of the thermal image, and to have the focusing structure arranged such that the thermal image is focused on that region and the optical/NIR image is focused on a different region of the imager 26. Certain parts of the optical/NIR field of view may not be of interest (e.g., the portion of the field occupied by the hood of the vehicle), and the frequency shifting elements may be segregated to that area of the imager 26, with the focusing structure then being designed to focus the FIR image in that area. Other permutations are also possible.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for imaging a scene, comprising a focusing structure for focusing light emanating from a scene on an imaging subsystem, and an imaging subsystem including an imager disposed within the optical path of said focusing structure and having an array of pixels sensitive to light at frequencies higher than far infrared frequencies, and a frequency shifter disposed between said focusing structure and said imager, where said frequency shifter includes an array of frequency-shifting elements disposed over a proper subset of said array of pixels, said elements shifting the far infrared frequencies from said focused light to higher frequencies and transmitting the resulting signals to said subset of said array of pixels.

2. Apparatus as set forth in claim 1, wherein said frequency shifter and said imager both have generally planar configurations and are oriented with their broad faces closely adjacent one another, and wherein said frequency shifter has frequency-shifting elements that are distributed in a regular recurring pattern disposed across the broad face of said frequency shifter.

3. Apparatus as set forth in claim 2, wherein said frequency shifting elements are spaced apart across said broad face of said frequency shifter by an integral multiple of the spacing of said pixels of said imager.

4. Apparatus as set forth in claim 1 wherein each pixel provides an associated pixel signal, and further comprising a processor for generating a thermal image from the pixel signals provided by said subset of said array of pixels.

5. Apparatus as set forth in claim 1 wherein each pixel provides an associated pixel signal, and further comprising a processor for generating a thermal image from the pixel signals provided by said subset of said array of pixels, and a non-thermal image from the pixel signals provided by pixels that are not part of said subset of said array of pixels.

6. Apparatus as set forth in claim 5, wherein said processor generates a non-thermal image including interpolated pixels in the locations of the pixels within said subset of said array of pixels.

7. Apparatus as set forth in claim 6, wherein said processor generates said interpolated pixels from pixel signals provided by adjacent pixels that are not part of said subset of said array of pixels.

8. Apparatus as set forth in claim 1, wherein said focusing structure comprises one or more lenses for focusing the far infrared image from said scene on a first area of said imager, and an image comprised of a different range of frequencies from said scene on a second area of said imager.

9. Apparatus for imaging a scene, comprising a focusing structure for focusing light emanating from a scene on an imaging subsystem, and an imaging subsystem including an imager disposed with the optical path of said focusing structure and having an array of pixels sensitive to light at frequencies higher than far infrared frequencies, and a frequency shifter disposed between said focusing structure and said imager, where said frequency shifter includes an array of frequency-shifting elements disposed over a proper subset of said array of pixels, said elements shifting the far infrared frequencies from said focused light to higher frequencies and transmitting the resulting signals to said subset of said array of pixels, wherein said focusing structure comprises one or more lenses for focusing the far infrared image from said scene on a first area of said imager, and an image comprised of a different range of frequencies from said scene on a second area of said imager, and wherein said one or more lenses are constructed and oriented such that said first and second areas are generally coincident and said far infrared image and said other image overlap and are aligned in registration with one another.

10. Apparatus for imaging a scene, comprising a focusing structure for focusing light emanating from a scene on an imaging subsystem, and an imaging subsystem including an imager disposed within the optical path of said focusing structure and having an array of pixels sensitive to light at frequencies higher than far infrared frequencies, and a frequency shifter disposed between said focusing structure and said imager, where said frequency shifter includes an array of frequency-shifting elements disposed over a proper subset of said array of pixels, said elements shifting the far infrared frequencies from said focused light to higher frequencies and transmitting the resulting signals to said subset of said array of pixels, wherein said focusing structure comprises one or more lenses for focusing the far infrared image from said scene on a first area of said imager, and an image comprised of a different range of frequencies from said scene on a second area of said imager, and wherein said one or more lenses are constructed and oriented such that said far infrared image and said other image are not in registration with one another.

11. A method of imaging a scene, comprising the steps of:
focusing light emanating from a scene on a surface having an array of pixels that are insensitive to far infrared light but are sensitive to light at other frequencies,
for a proper subset of pixels of said array of pixels, shifting the far infrared component of the light to a frequency to which said pixels are sensitive, and
generating separate thermal and non-thermal images from said array of pixels.

12. A method as set forth in claim 11, wherein the shifting step includes the step of shifting the frequency of the far infrared component of the light that is focused on selected pixels disposed in a regular recurring pattern across said array of pixels.

13. A method as set forth in claim 11, wherein the step of generating images comprises the assembling the pixels from said proper subset of pixels into said thermal image and assembling all other pixels into said non-thermal image.

14. A method of imaging a scene, comprising the steps of: focusing light emanating from a scene on a surface having an array of pixels that are insensitive to far infrared light but are sensitive to light at other frequencies, for a proper subset of pixels of said array of pixels, shifting the far infrared component of the light to a frequency to which said pixels are sensitive, and generating separate thermal and non-thermal images from said array of pixels, wherein the step of generating images comprises the assembling the pixels from said proper subset of pixels into said thermal image and assembling all other pixels into said non-thermal image, and wherein the step of assembling all other pixels into said non-thermal image includes the step of creating an estimated nonthermal value for each pixel in said proper subset of pixels and using said estimated non-thermal pixel values in assembling said nonthermal image.

15. The method of claim 14, wherein said step of creating an estimated nonthermal value for each pixel in said proper subset includes the step of creating an average of the values of pixels adjacent each said pixel in said proper subset and using said average as the estimated nonthermal value for said pixel.

16. A method of imaging a scene, comprising the steps of: focusing light emanating from a scene on a surface having an array of pixels that are insensitive to far infrared light but are sensitive to light at other frequencies, for a proper subset of pixels of said array of pixels, shifting the far infrared component of the light to a frequency to which said pixels are sensitive, and generating separate thermal and non-thermal images from said array of pixels, wherein the step of shifting comprises the steps of detecting far infrared light at each said pixel in said proper subset of pixels and, at said pixel, generating light at a non-far infrared frequency but at a level proportional to the level of said detected far infrared light.

* * * * *